UNITED STATES PATENT OFFICE.

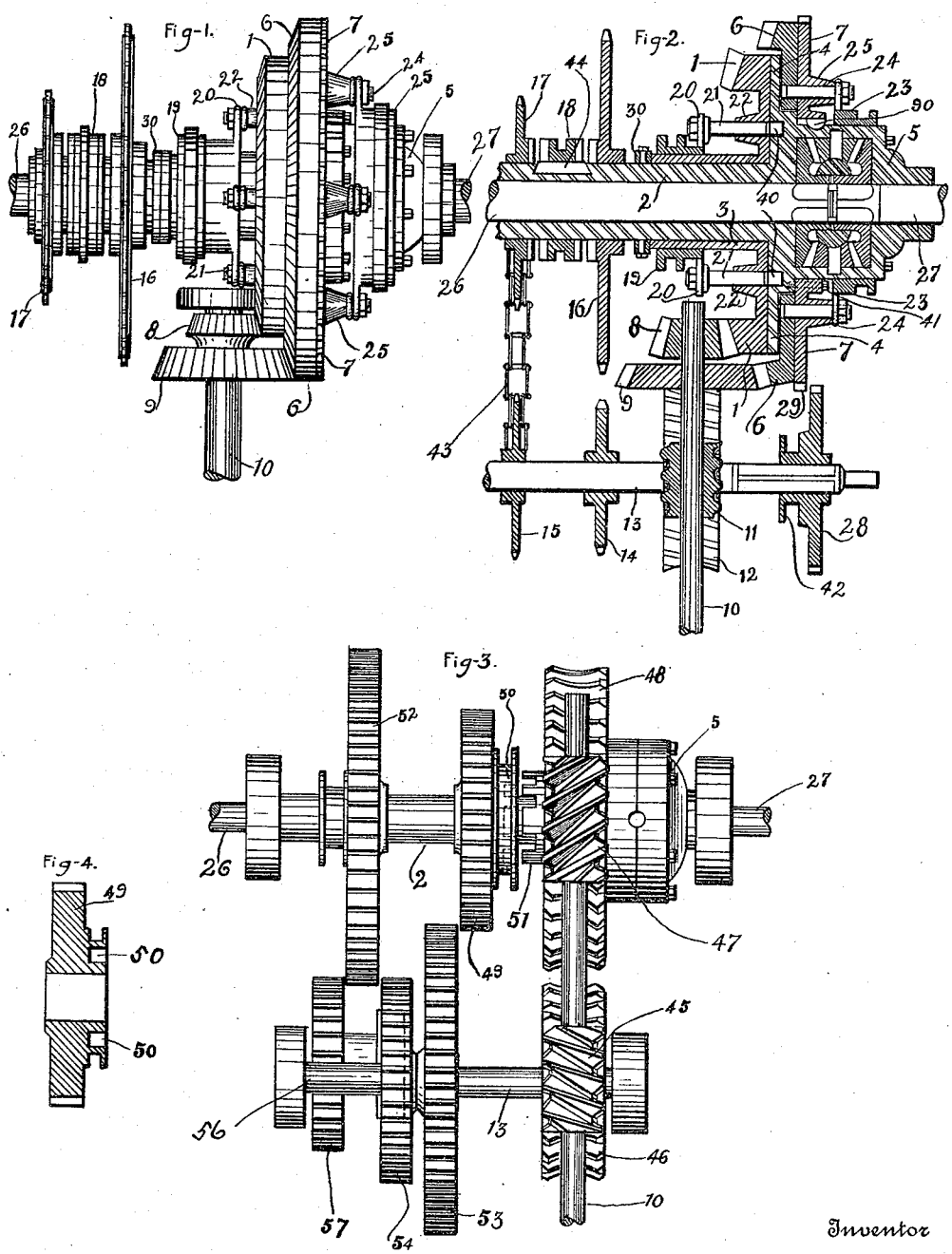

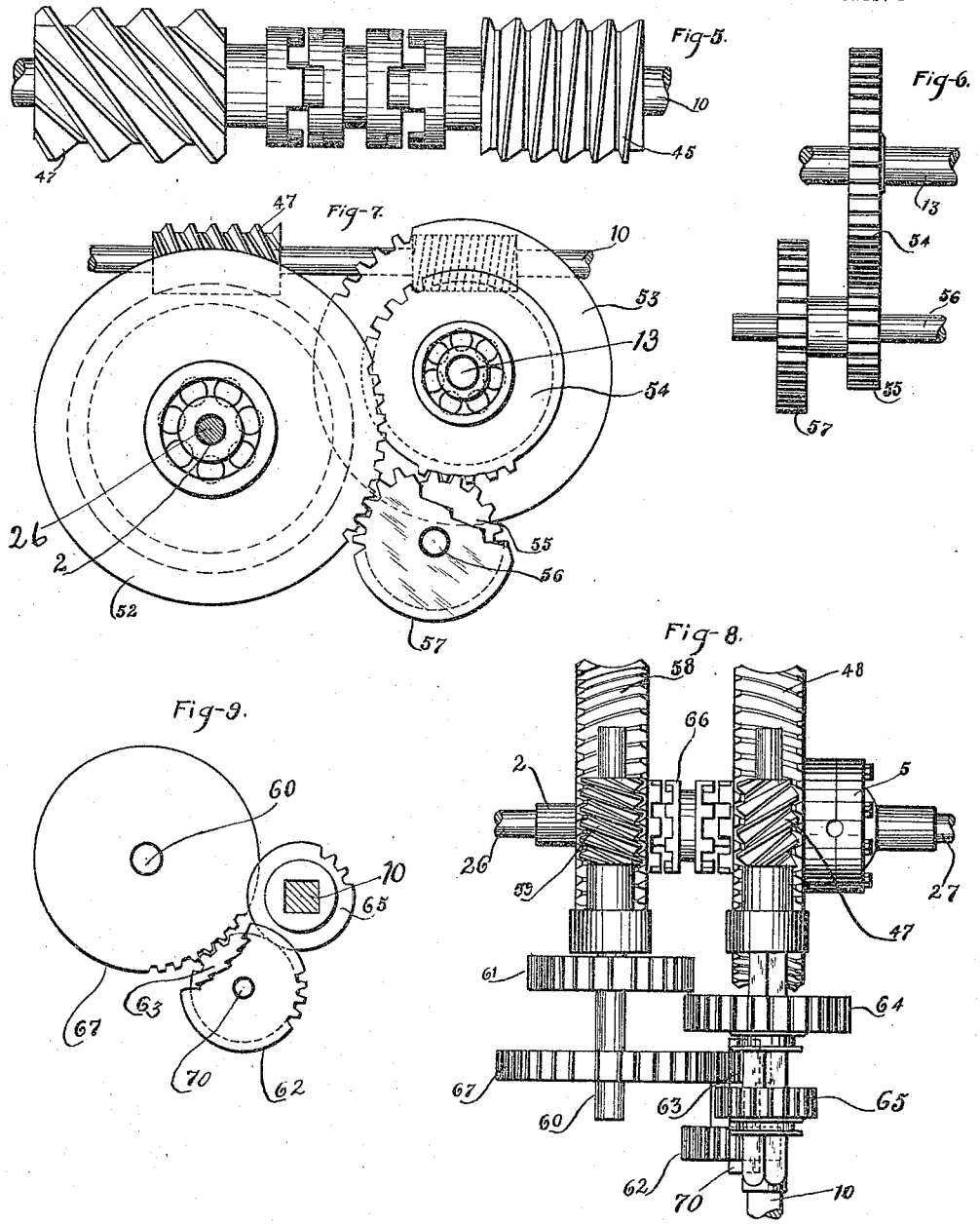

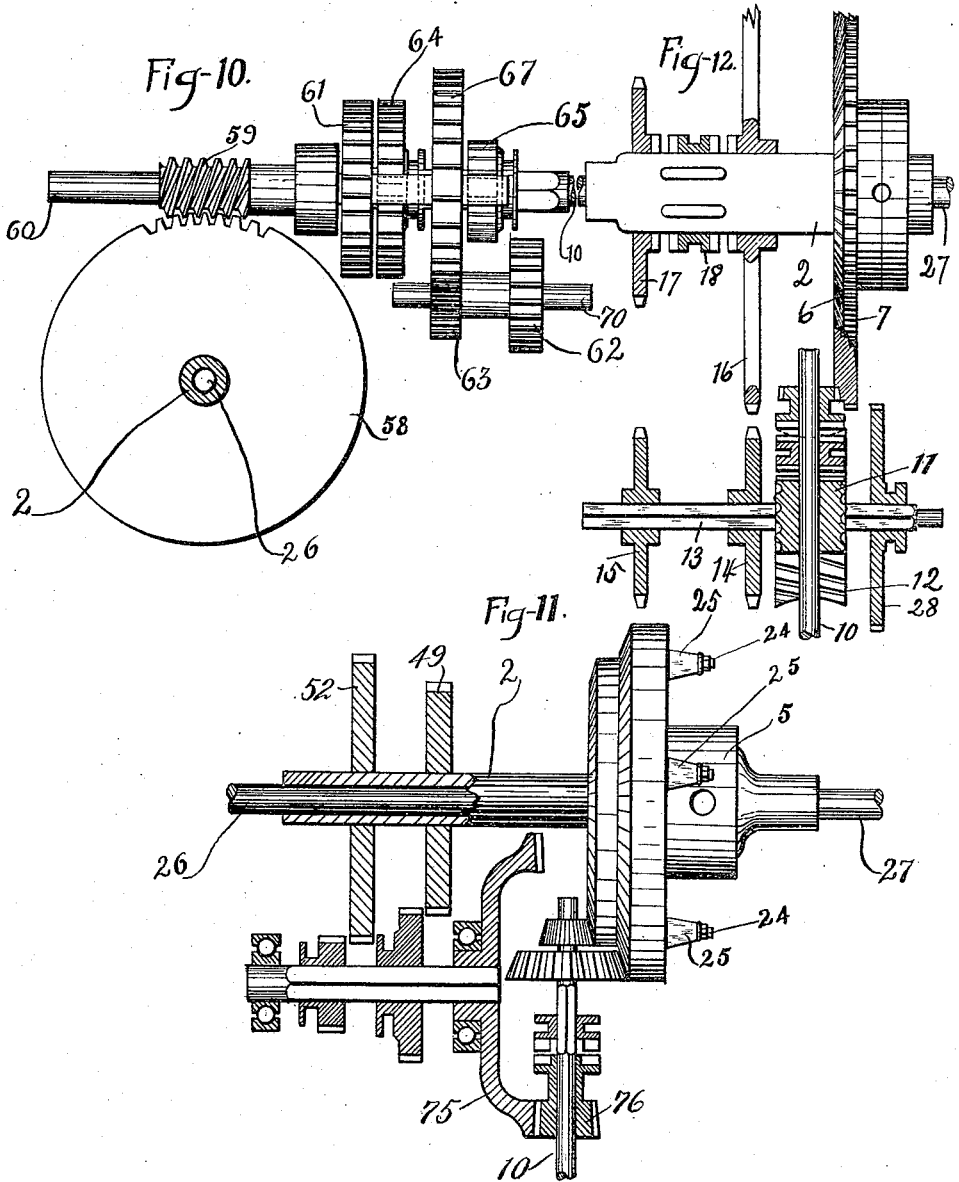

EDGAR BYARS, OF AMARILLO, TEXAS.

DRIVING-GEAR FOR MOTOR-VEHICLES.

1,183,532.  Specification of Letters Patent.  Patented May 16, 1916.

Application filed March 9, 1914. Serial No. 823,308.

*To all whom it may concern:*

Be it known that I, EDGAR BYARS, a citizen of the United States, residing at Amarillo, in the county of Potter and State of Texas, have invented certain new and useful Improvements in Driving-Gear for Motor-Vehicles, of which the following is a specification.

My invention relates to driving gearing for automobiles, motor trucks, tractors, motor cars, and other vehicles; and the object is to provide such vehicles with more than one direct drive, as commonly used, and to provide a transmission in which the power is carried through only two sets of gearing and which provision avoids the necessity of carrying the power while using the transmission through the direct drive, as commonly used. The advantage of this provision is that the gearing used for direct drive need be only sufficient to carry the direct power of the engine or motor,—requiring gearing only about one-third as heavy as when the back gearing is used through the transmission, as in starting the vehicle, coming to hills, sand, mud or anywhere the direct drive will not be sufficient. Another advantage is that the power is carried independent of the direct drive and there will be less noise, and less vibration, less fuel will be required and the life of the engine will be prolonged by using two direct drive ratios.

Other objects and advantages will be fully explained in the following description and the invention will be more particularly pointed out in the claims.

Reference is had to the accompanying drawings which form a part of this application.

Figure 1 is a plan view of the improved gearing. Fig. 2 is a horizontal section of the same, some additional gearing being shown. Fig. 3 is a variation, being a plan view of a worm direct drive and combination worm and spur gear transmission, giving three speeds forward and one reverse. Fig. 4 is a section of an intermediate gear used in the gearing shown in Fig. 3. Fig. 5 is a detail view of a dog clutch for use in making the worm gearing neutral. Fig. 6 is a detail horizontal view, illustrating the manner of making the reverse spur gear mesh. Fig. 7 is a detail view of the gearing shown in Fig. 3. Fig. 8 is plan view of a gearing, showing a variation of the gearing shown in Fig. 3. Fig. 9 is a side elevation of three gear wheels shown in Fig. 8. Fig. 10 is a side elevation of the gearing shown in Fig. 8. Fig. 11 is a variation, showing the use of bevel or miter gearing instead of the worm gear previously shown. Fig. 12 is a variation of the gearing, shown in Figs. 1 and 2.

Similar characters of reference are used to indicate the same parts throughout the several views.

In the drawings differential gearing of ordinary type is shown in a casing 5 provided with shafts 26 and 27. The differential casing has a sleeve 2 formed integral therewith and a locking head 4 is formed radially on the casing and integral therewith. A bevel gear wheel 1 is loosely mounted on the sleeve 2 and has a sleeve 3 engaging the sleeve 2. Means are provided for locking the gear wheel 1 to the head 4. A collar 19, slidable on sleeve 3, has radial arms 20 which carry bolts 21. The wheel 1 has a series of bosses 22 which are perforated, the perforations extending through the wheel. The head 4 has a series of recesses 40, corresponding in location with the bolts 21 and the perforated bosses 22, to receive the bolts 21 when these bolts are thrust through the wheel 1. By means of the collar 19, the bolts 21 can be thrown into the recesses in head 4 for locking the wheel 1 rigid with the head 4 for driving purposes and the bolts can be withdrawn with the same collar when the wheel 1 is not to be driven. The wheel 1 will give one speed to the driving shafts 26 and 27. The wheel 1 is driven by a pinion 8 which is rigid with shaft 10. The shaft 10 is driven by the engine and drives the transmission or counter shaft 13 which has a worm gear wheel 12 rigid therewith which is driven by the worm gear wheel 11 which is rigid with shaft 10.

For a different speed, a gear wheel 6 is loosely mounted on an annular shoulder on the head 4. A cog wheel 7 is bolted to the head 4 by bolts 41 and is rigid therewith and strengthened by keys 90. The wheel 7 has perforated bosses 25 and bolts 24 are slidably mounted in the bosses 25. A collar 23, slidable on the differential casing 5, has arms which carry the bolts 24. The wheel 6 has a series of openings, corresponding in location with the bolts 24, to receive these bolts for the purpose of locking the wheel 6 rigid with the head and for unlocking the wheel 6 from head 4. The perforated bosses 22 and 25 form guide bearings for the bolts 21 and 24 respectively. When the wheel is not locked to head 4, it will run loosely on the shoulder on said head. The wheel 6 is driven by a pinion 9 which is rigid with the shaft 10 which drives the transmission shaft 13. A collar 30, mounted on sleeve 2, holds the wheel 1 in close contact with the head 4. The wheel 1 will give one speed to the vehicle being driven and the wheel 6 will give another speed. Another speed is obtained by means of the wheel 7. This is done by providing a pinion 28 on shaft 13 which pinion can be shifted into and out of mesh with the wheel 7 by means of a collar 42.

The sleeve 2 may be driven direct from shaft 13. Gear wheels 16 and 17 are loosely mounted on sleeve 2 and gear wheels or sprocket wheels 14 and 15 are rigidly mounted on shaft 13. Sprocket wheels 14 and 16 and 15 and 17 may be operatively connected by sprocket chains 43. A collar 18, slidable on sleeve 2, may be used to lock either wheel 17 or 16 to the sleeve 2 by means of a key 44. Thus either wheel 16 or 17 can be rigidly locked to sleeve 2, and wheel 16 can be driven from shaft 13 or wheel 17 can be driven from shaft 13. The collar 18 can be shifted to neutral position so that neither wheel 16 or 17 will be rigid with sleeve 2.

Suppose that none of the gearing is locked in position for driving: If high direct drive is wanted, collar 23 is shifted by a suitable lever (not shown) to throw the plunger bolts 24 into the recesses in wheel 6 to lock the same to the driving head 4 through the head 7. If low direct drive is wanted, shift the bolts 24 out of wheel 6. Then with collar 19 throw the bolts 21 into wheel 1, locking the same to head 4. Wheel 1 will be driven by pinion 8. In the high direct drive, wheel 6 is driven by pinion 9.

If low gear is wanted, unlock wheel 1. Then with collar 18, lock wheel 16 rigid with sleeve 2. The differential will then be driven through the wheel 14 and shaft 13. If intermediate or second gear is wanted, unlock wheel 16 from the sleeve 2, and with collar 18 lock wheel 17 to sleeve 2. The sleeve 2 and the differential gearing will be driven by the wheel 15 and shaft 13, shaft 13 being driven by worm gearing 11 and 12 and shaft 10.

If reverse is wanted, unlock wheel 17. Then with collar 42, shift wheel 28 in mesh with the teeth 29 on head 7. The gearing will be driven by the shaft 13 and worm gearing 12 and 11 and shaft 10.

Fig. 3 shows a variation in the gearing for driving the shafts 26 and 27 and the differential gearing contained in the casing 5. A worm gear 45 is rigid with drive shaft 10 and meshes with worm gear wheel 46 which is rigid with counter shaft 13. A high direct drive worm gear wheel 47 is rigid with shaft 10 and meshes with a worm gear wheel 48 which is mounted loosely on the differential sleeve 2. An intermediate gear wheel 49 is mounted on the sleeve 2, that is, this wheel 49 is non-revolubly mounted on the sleeve 2 but is slidable axially thereon and has a collar with recesses 50 therein and wheel 48 has clutch teeth 51 rigid therewith so that the wheel 49 can be used to lock the wheel 48 rigid with the sleeve 2. A low gear wheel 52 is slidably mounted on the sleeve 2. Gear wheels 53 and 54 are rigid with the counter or transmission shaft 13. A spur gear 55 is mounted on shaft 56 and is adapted to mesh with gear wheel 54, and a spur gear wheel 57 rigid with wheel 55 is adapted to mesh with gear wheel 52.

If high direct drive is wanted, wheel 49 is shifted so that the clutch teeth 51 will lock wheel 49 to worm gear wheel 48. The wheel 49 thus acts merely to lock the worm wheel 48 to the differential so that the differential will be driven by the gear wheels 47 and 48.

If low drive is wanted, unlock wheel 49 from wheel 48 and then shift wheel 52 into mesh with wheel 54. The differential gearing will then be driven from the shaft 10 through worm gearing 45 and 46 and shaft 13.

If reverse is wanted, unlock or unmesh wheel 52 from wheel 54 and shift wheel 52 into mesh with gear wheel 57 which may be in the casting with wheel 55. Thus the reverse is also driven through worm gearing 45 and 46 and shaft 13.

If intermediate drive is wanted, gear wheel 49 is shifted in mesh with wheel 53, which is driven from shaft 10 through gear wheels 45 and 46 and shaft 13.

A variation of the gearing shown in Fig. 3 is shown in Fig. 8. The gear wheel 48 is, as in Fig. 3, loosely mounted on the differential 5 and wheel 47 is rigid with shaft 10. A worm gear wheel 58 is loosely mounted on sleeve 2. A worm gear wheel 59 is rigid with a transmission shaft 60 and meshes with the wheel 58. A spur gear wheel 61 is rigid with shaft 60. Spur gear wheels 62 and 63, similar to wheels 55 and 57 of Figs. 6 and 7, are mounted on the shaft 70. Spur gear wheels 64 and 65 are slidable on shaft 10. A dog clutch 66 is adapted to lock either wheel 48 or 58 to the differential sleeve 2. If high direct drive is wanted, shift clutch 66 to lock wheel 48 to the differential gearing. If low drive is wanted, shift clutch 66 to unlock wheel 48 and to lock wheel 58 rigid with the differential gearing, and the wheel 65 which is non-revoluble on shaft 10 is brought into mesh with wheel 67 which is rigid with shaft 60. If reverse is wanted, wheel 65, which is non-revoluble on shaft 10, is shifted to mesh with wheel 62, and wheel 63 which is rigid with wheel 62 will drive wheel 67. If intermediate drive is wanted, the wheel 65 is shifted to neutral position and wheel 64, which is non-revoluble on shaft 10, is shifted to mesh with wheel 61.

In Fig. 3, the shaft 10 is driven in the same direction both for driving and reversing. This makes the construction more simple and less expensive, avoiding one set of bearings. The thrust of the shaft is only in one direction.

One advantage of the gearing above described is that the power is carried through only two sets of gearing in low and intermediate drives whereas in the old construction the power was carried through three sets of gearing, and the reverse is carried through only three sets where in the old construction the reverse was carried through four sets.

The variations shown in Fig. 12 meet the description of the construction shown in Figs. 1 and 2. The variations shown in Fig. 11 include a miter gear wheel 75 to take the place of gear wheel 12 or 46 in Figs. 2 and 3 respectively and a miter pinion 76 to take the place of gear wheel 11 or 45 in Figs. 2 and 3 respectively.

Having fully described my invention, what I claim, is,—

1. In a driving gear for motor vehicles provided with a differential gearing, a casing, a sleeve formed integral with said casing and a driving head formed integral with said casing and projecting radially therefrom, a gear wheel loosely mounted on said sleeve and having a sleeve engaging the first mentioned sleeve and having guide bearings, a collar slidably mounted on the last mentioned sleeve and radial arms formed on said collar, bolts carried by said arms and operating in said guide bearings to lock said gear wheel to said driving head, said driving head having recesses to receive said bolts, and means for driving said gear wheel.

2. In a driving gear for motor vehicles provided with a differential gearing, a casing, a driving head formed radially on said casing, a sleeve formed on one side of said head and an annular shoulder formed on the other side of said head, a low speed direct drive wheel mounted loosely on said sleeve and a high speed direct drive wheel mounted loosely on said shoulder, means for locking either one of said wheels to said head, a driving shaft and pinions thereon for driving said gear wheels.

3. In a driving gear for motor vehicles provided with a differential gearing, a casing, a driving head formed radially on said casing, a sleeve formed on one side of said head and an annular shoulder on the other side of said head, a low speed direct drive wheel mounted loosely on said sleeve, a high speed direct drive wheel mounted loosely on said shoulder, means for locking either one of said gear wheels to said head, a driving shaft, pinions thereon for driving said gear wheels, a reverse gear wheel rigid with said driving head and preventing displacement of said high speed direct drive wheel, a transmission shaft, a gear slidable thereon for driving said reverse gear wheel, and gearing for driving said transmission shaft from said driving shaft.

4. In a driving gear for motor vehicles provided with a differential gearing, a casing, a sleeve formed on one side of said casing, a driving head formed radially on said casing and an annular shoulder on said head, a high speed direct drive wheel mounted loosely on said shoulder, a low speed direct drive wheel mounted loosely on said sleeve, means for locking either one of said wheels to said head, a driving shaft, pinions thereon for driving said wheels, a low speed driving gear wheel and an intermediate driving gear wheel mounted loosely on said sleeve, means for locking either one of said wheels to said sleeve, a transmission shaft driven by said driving shaft, gearing on the transmission shaft for driving said low speed and intermediate driving wheels, a reverse gear wheel rigid with said driving head, and a gear non-revolubly and slidably mounted on said transmission shaft for driving said reverse gear.

5. In a driving gear for motor vehicles provided with a differential gearing, a casing, a driving head formed radially on said casing, a sleeve formed on one side of said head and an annular shoulder formed on the other side of said head, a high speed direct drive wheel mounted loosely on said shoulder, a low speed direct drive wheel mounted loosely on said sleeve, means for locking either one of said wheels to said head, a driving shaft, pinions on said driving shaft for driving said wheels, a low speed driving gear wheel mounted loosely on said sleeve, an intermediate driving gear wheel mounted loosely on said sleeve, means for locking either one of said gear wheels to said sleeve, a counter or transmission shaft driven from said driving shaft, and gearing on the transmission shaft for driving either said low speed driving gear wheel or said intermediate driving gear wheel.

6. In a driving gear for motor vehicles provided with a differential gearing, a casing, a sleeve rigid with said casing, a gear wheel loosely mounted on said casing, means for locking said gear wheel rigidly with said casing, a driving shaft, a gear wheel on said driving shaft for driving the first named gear wheel, variable speed gearing mounted on said sleeve, a transmission shaft driven from said driving shaft, and variable speed driving connections on said transmission shaft for driving said variable speed gearing.

In testimony whereof I set my hand, in the presence of two witnesses, this 12th day of February, 1914.

EDGAR BYARS.

Witnesses:
R. D. GIST,
C. P. HUTCHINGS.

Copies of this patent may be obtained for five cents each, by addressing the "Commissioner of Patents, Washington, D. C."